United States Patent [19]

Julseth

[11] Patent Number: 4,727,948
[45] Date of Patent: Mar. 1, 1988

[54] REAR CRAWLER TRACK RETROFIT FOR GARDEN AND LAWN TRACTORS

[76] Inventor: Richard A. Julseth, Rte. 2, Box 59, Brandon, Minn. 56315

[21] Appl. No.: 893,643

[22] Filed: Aug. 6, 1986

[51] Int. Cl.[4] .............................................. B62D 55/04
[52] U.S. Cl. ................................. 180/9.26; 180/9.58; 180/185; 305/29; 305/35 EB
[58] Field of Search ..................... 180/9.26, 9.21, 9.38, 180/9.58, 9.62, 9.64, 185; 280/686; 305/29, 35 EB, 54, 56, 25

[56] References Cited

U.S. PATENT DOCUMENTS

| | | | |
|---|---|---|---|
| 1,293,757 | 2/1919 | Green | 180/9.62 |
| 1,503,620 | 8/1924 | Zesbaugh | 305/29 |
| 1,659,297 | 2/1928 | Langenfeld | 180/9.26 X |
| 1,697,915 | 1/1929 | Fast | 180/9.26 |
| 1,809,161 | 6/1931 | Dunnigan | 180/185 |
| 2,057,211 | 10/1936 | Shere | 180/9.38 |
| 2,074,389 | 3/1937 | Grant | 180/9.62 |
| 2,093,229 | 9/1937 | Bowman | 180/185 |
| 2,627,442 | 2/1953 | Junker | 180/9.26 X |
| 2,644,539 | 7/1953 | Gazda | 180/9.58 |
| 2,706,663 | 4/1955 | Heckerman, Jr. | 305/29 |
| 2,739,017 | 3/1956 | Arps | 305/35 EB |
| 3,039,828 | 6/1962 | Johnston | 180/9.26 X |
| 4,362,340 | 12/1982 | Lely | 180/9.21 X |
| 4,635,740 | 1/1987 | Krueger et al. | 180/9.26 X |

*Primary Examiner*—John J. Love
*Assistant Examiner*—Mitchell J. Hill
*Attorney, Agent, or Firm*—Fleit, Jacobson, Cohn & Price

[57] ABSTRACT

A rearwardly projecting mounting arm is provided for the rear of a lawn or garden tractor and has its forward end secured anchored relatively to the rear drive wheel axle of the tractor. The rear end portion of the mounting arm mounts longitudinal mid-portion of a transverse idle wheel axle therefrom for adjustable positioning of the idle wheel axle longitudinally of the mounting arm and the idle wheel axle includes a pair of opposite end idle wheels journalled therefrom in front-to-rear alignment with drive wheels journalled from the drive axle. The lower peripheral portions of the idle wheels are spaced approximately 1 to 2 inches above the lower peripheral portions of the drive wheels and endless flexible track assemblies are trained about corresponding drive and idle wheels.

10 Claims, 8 Drawing Figures

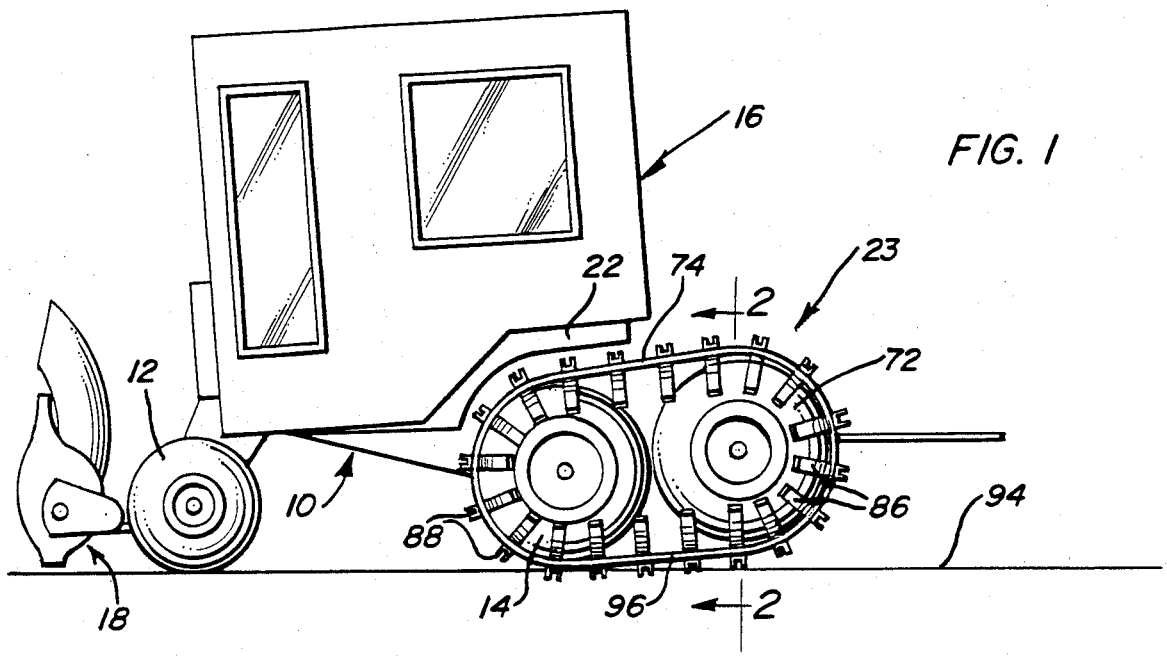
FIG. 1
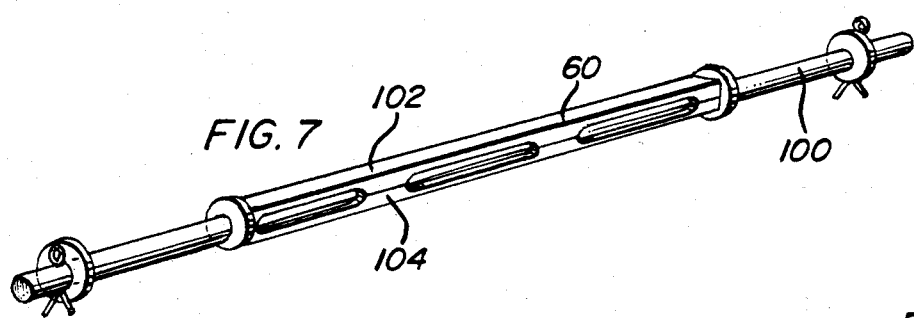
FIG. 7
FIG. 2
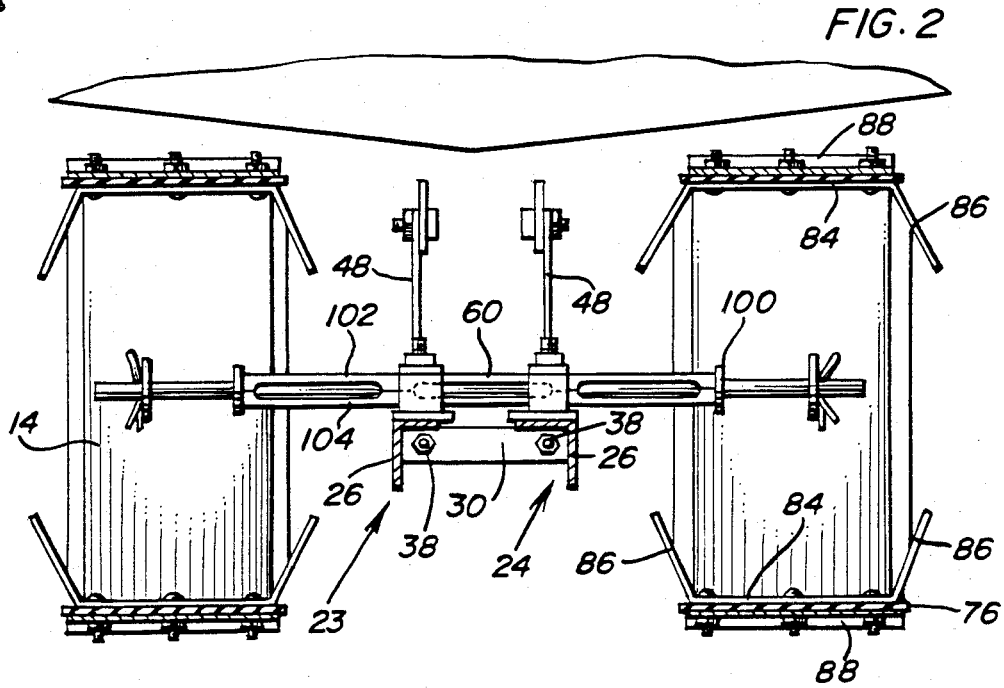

REAR CRAWLER TRACK RETROFIT FOR GARDEN AND LAWN TRACTORS

BACKGROUND OF THE INVENTION

1. Field of the Invention

This invention relates to small lawn and/or garden tractors to and structure by which a tractor may be retrofitted to include opposite side rear crawler track drive assemblies with the crawler track assemblies being slightly rearwardly and upwardly inclined to facilitate turning of the tractor on not only firm support surfaces but also softer support surfaces.

2. Description of Related Art

Various different forms of retrofit crawler track assemblies heretofore have been provided for different forms of land vehicles. Examples of these different forms of crawler track assemblies are disclosed in U.S. Pat. Nos. 1,293,757, 1,659,297, 1,697,915, 1,809,161, 2,057,211, 2,093,229, 2,627,442, 3,039,828 and 4,362,340.

However, these different forms of crawler track assemblies are not constructed in the manner of the instant invention for ease of retrofit to existing lawn and garden tractors and further do not include crawler track assemblies which are permanently mounted in slightly rearwardly and upwardly inclined positions which facilitate turning of the associated tractor.

SUMMARY OF THE INVENTION

The crawler track assemblies of the instant invention have been specifically designed for ease in retrofitting existing lawn and garden tractors in order that the latter may be economically and relatively easily fitted with rear crawler track assemblies. In addition, the crawler track assemblies of the instant invention are constructed in a manner such that they are slightly rearwardly and upwardly inclined, insofar as the lower reaches of the endless track members thereof are concerned, and in this manner a retrofitted garden or lawn tractor retains a substantial portion of its original maneuverability.

The main object of this invention is to provide a structure by which a lawn or garden tractor may be retrofitted to include rear opposite side driving endless track assemblies.

Another object of this invention is to provide a structure in accordance with the preceding objects and which includes structural components whereby only slight modifications thereto are required in order to retrofit different makes and models of lawn and garden tractors.

A further object of this invention is to provide and endless track retrofit assembly for small tractors and incorporating structure by which the endless track members thereof may be readily adjusted in tension.

Yet another important object of this invention is to provide a retrofit endless track assembly for small lawn and garden tractors and wherein the retrofit assembly incorporates a rearwardly projecting pulling tongue.

A final object of this invention to be specifically enumerated herein is to provide a crawler track assembly for small lawn and garden tractors and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a side elevational view of a small lawn tractor which has been retrofitted in accordance with the present invention to include rear driving crawler track assemblies, the tractor also having an operator's enclosure thereon for use in extremely cold weather during snow blowing operations;

FIG. 2 is an enlarged fragmentary transverse vertical sectional view taken substantially upon the plane indicated by the section line 2—2 of FIG. 1;

FIG. 7 is a perspective view of the idle wheel axle assembly of the retrofit structure.

DESCRIPTION OF THE PREFERRED EMBODIMENT

Figure 3:
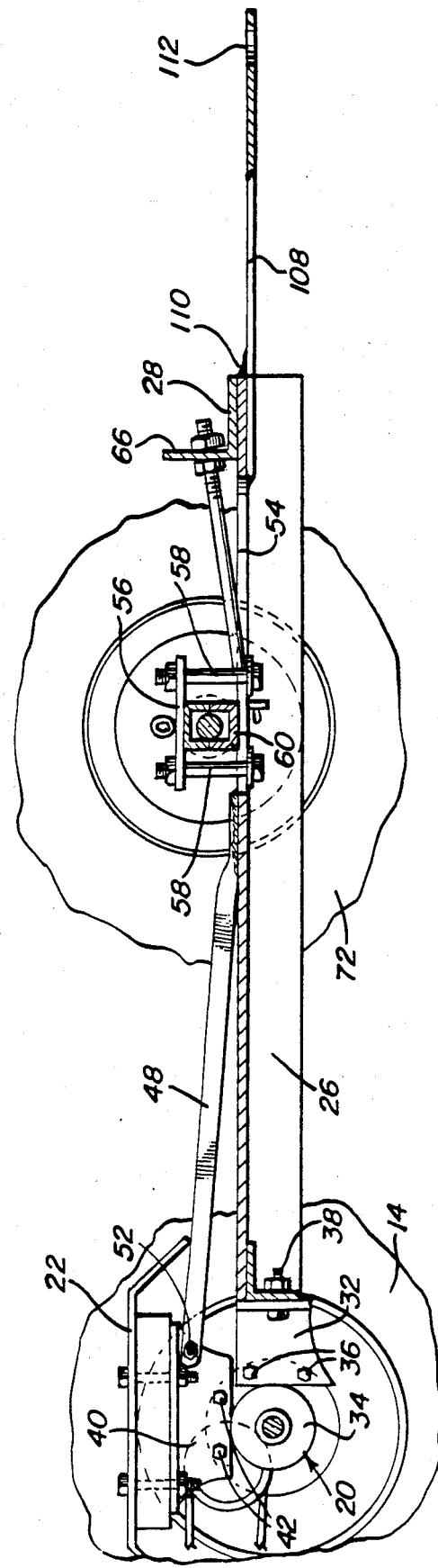
FIG. 3 is an enlarged fragmentary longitudinal vertical sectional view illustrating the manner in which the endless crawler track assembly is mounted from the rear axle housing of the lawn tractor.
Figure 4:
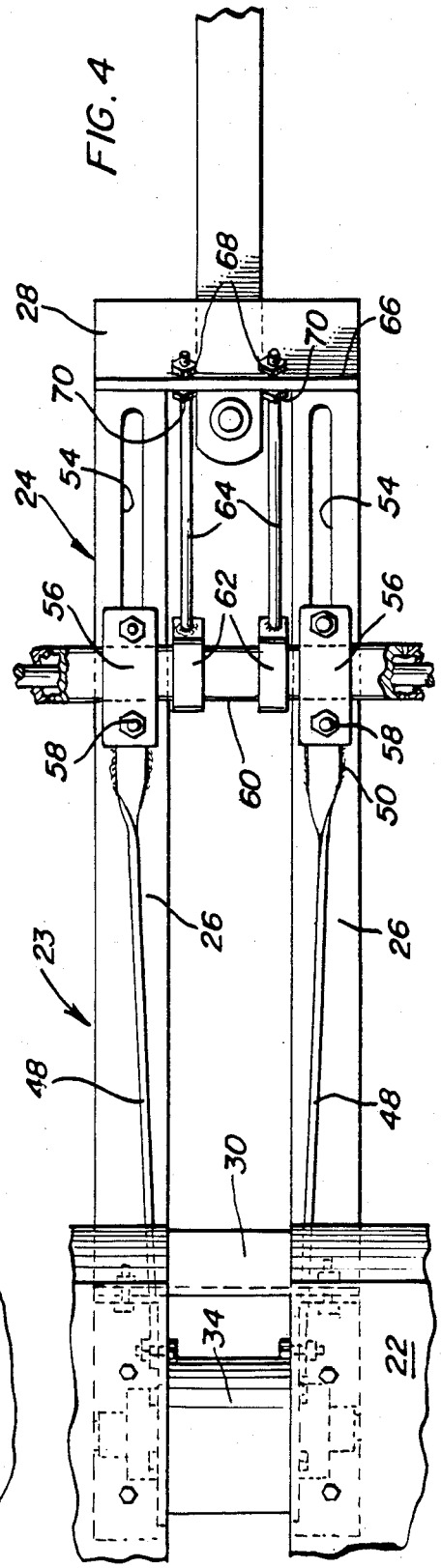
FIG. 4 is a top plan view of the mounting portion of the crawler track assembly illustrated in FIG. 3.
Figure 5:
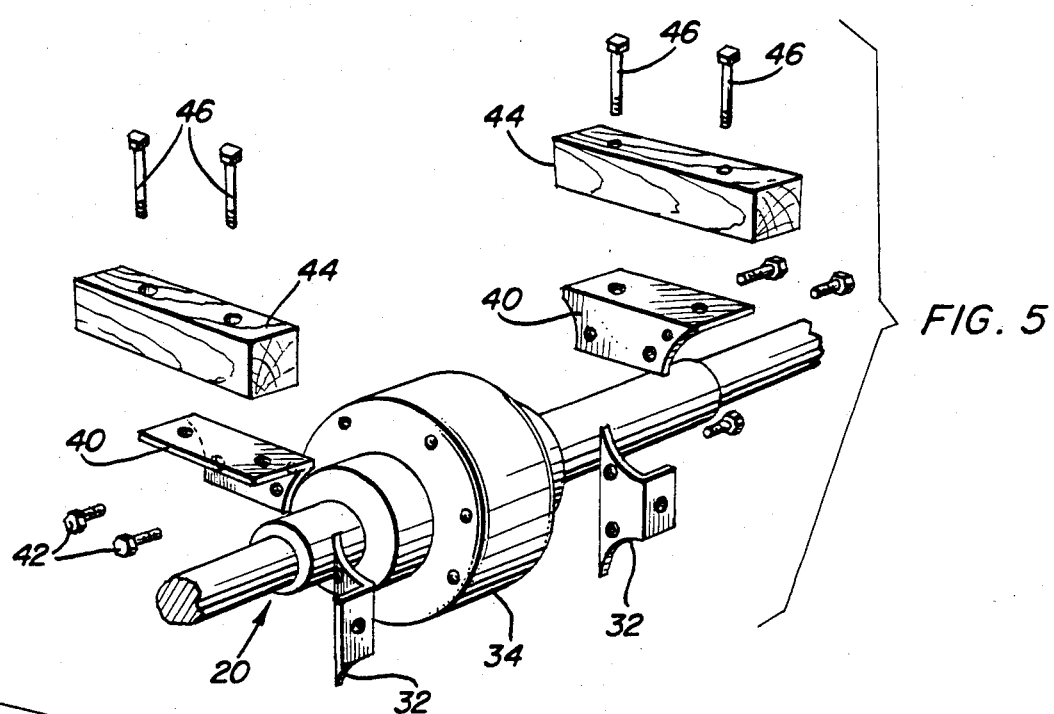
FIG. 5 is a fragmentary exploded perspective view illustrating the manner in which the crawler track assembly support arm mounting and brace brackets are operatively associated with the rear axle of the associated lawn tractor and also the manner in which the retrofit structure includes fender elevating spacing blocks.
Figure 6:
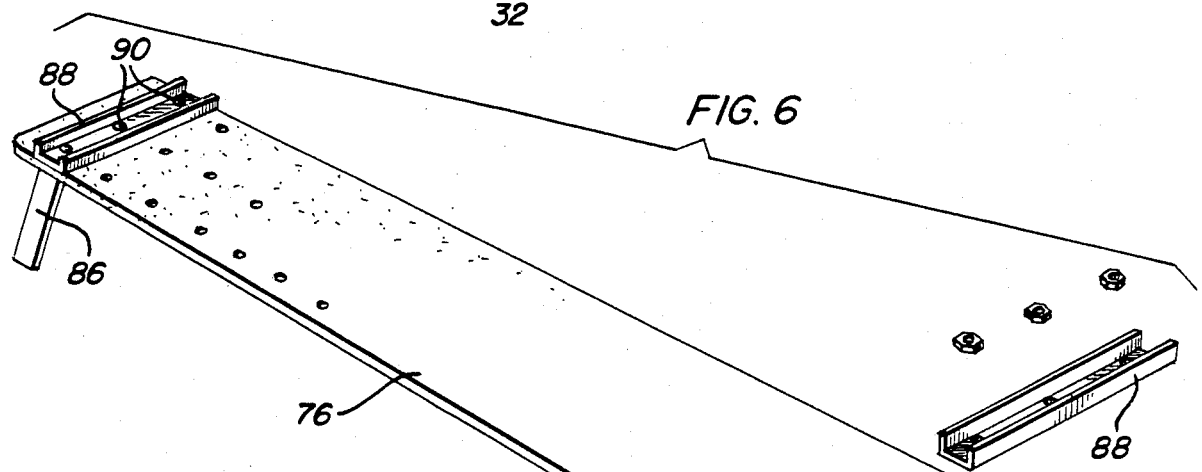
FIG. 6 is a fragmentary perspective view of one of the endless tracks in extended horizontal position and with one of the five cleats and wheel guide structures in exploded position.
Figure 8:
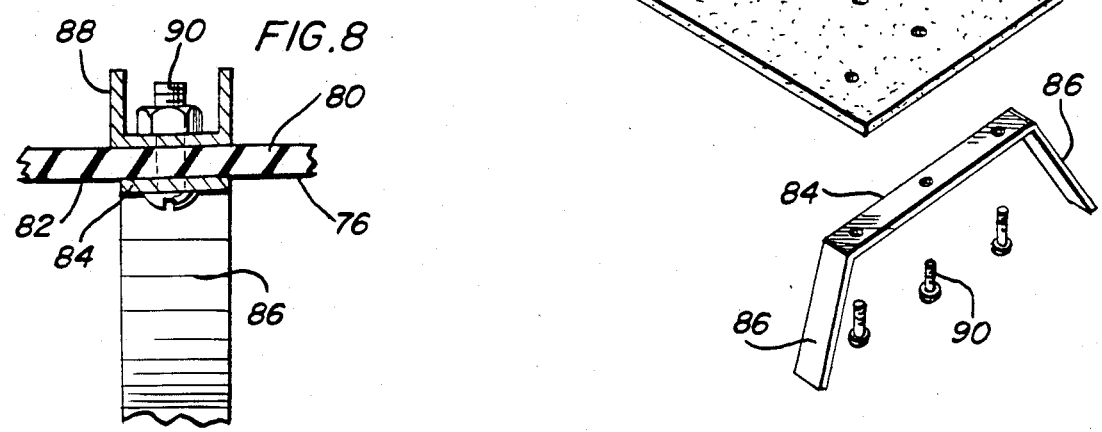
FIG. 8 is a fragmentary enlarged vertical sectional view illustrating the manner in which one of the guide brackets and the associated driving cleat are secured to the corresponding endless track belt.

Referring now more specifically to the drawings, the numeral 10 generally designates a lawn or garden tractor including opposite side front steerable wheels 12 and opposite side non-steerable rear driving wheels 14. The tractor 10 has an operator's enclosure referred to in general by the reference numeral 16 mounted thereon for comfort of the operator in extremely cold weather and a snow blower assembly referred to in general by the reference numeral 18 is mounted on the front of the tractor 10.

The rear driving wheels 14 are mounted on the opposite ends of a rear transverse drive axle assembly 20 and opposite side fenders 22 are mounted from the axle assembly 20 and overlie the rear driving wheels 14.

The endless track assembly of the instant invention is referred to in general by the reference numeral 23 and includes an elongated generally horizontal mounting arm referred to in general by the reference numeral 24. The mounting arm 24 includes a pair of opposite side longitudinally extending and transversely spaced angle members 26 interconnected at their rear ends by a rear transverse angle member 28 and interconnected at their front ends by a front transverse angle member 30. A pair of opposite side rear mounting brackets 32 are removably mounted to opposite sides of the center unit 34 of the axle assembly 20 through the utilization of fasteners 36 and a pair of fasteners 38 removably mount the front transverse angle member 30 of the mounting arm 24 to the mounting brackets 32. In addition, a pair of upper opposite side mounting brackets 40 are mounted from opposite side upper portions of the center unit 34 by fasteners 42 and the mounting brackets 40 support spacer blocks 44 therefrom. Suitable fasteners 46 are secured downwardly through the fenders 22, the blocks 44 and the brackets 40 whereby the fenders 22 are mounted in elevated position relative to the drive axle assembly 20.

A pair of opposite side longitudinally extending and inclined bracing bars 48 include rear ends welded to the angle members 26 as at 50 and forward ends secured to the corresponding mounting brackets 40 by fasteners 52. In addition, the rear ends of the angle members 26 are longitudinally slotted at 54 and hold-down plates 56 and fasteners 58 mount opposite end portions of a transverse idle wheel axle 60 from the rear ends of the angle members 26 for adjustable positining therealong. The longitudinal mid-portion of the axle 60 has a pair of longitudinally spaced anchors 62 mounted thereon and adjustment rods 64 extend rearwardly from the anchors 62 and are adjustably secured through the upstanding flange 66 of the angle member 28 by threaded nuts 68 and 70.

The opposite ends of the axle 60 journal a pair of idle wheels 72 therefrom and the idle wheels 72 are radially aligned with the driving wheels 14. In addition, the lower peripheral portions of the idle wheels 72 are spaced 2 inches above the lower peripheral portions of the driving wheels 14.

A pair of endless belts 74 are provided and comprise elongated belt sections 76 including outer and inner surfaces 80 and 82. A plurality of channel sections 84 including divergent arms 86 are secured to each section 76 at points spaced longitudinally therealong over the inner surface 82 thereof and an equal number of channel cleats 83 are secured to each section 76 over the outer surface 80 thereof, each channel section and a corresponding channel cleat 88 being secured to the corresponding section 76 through the utilization of a plurality of threaded fasteners 90 secured through the section 84 and cleat 88 as well as the section 76.

The driving and idle wheels 14 and 72 are of substantially the same size and each endless belt 74 is trained about a corresponding pair of wheels 14 and 72 with the channel sections 84 thereof embracingly engaging opposing outer peripheral portions of the wheels 14 and 72. Thus, the channel sections 84 guidingly engage the wheels 14 and 72 and serve to maintain the endless belts 74 trained about the pairs of corresponding wheels 14 and 72. The cleats 88 are provided to increase driving frictional engagement of the endless track assembly 23 with the support surface 94 upon which the tractor 10 is disposed and it will be noted from FIG. 1 of the drawings that the endless track assembly 23 is visually ascertainable as rearwardly and upwardly inclined relative to the surface 94, insofar as the lower reaches 96 of the endless belts 74 are concerned. The lowermost peripheral portions of the idle wheels 72 are preferably spaced 1 inch above the lower marginal portions of the driving wheels 14 although this spacing may vary and could be up to 2 inches. This spacing may vary according to the type of surface upon which the tractor 10 is to be operated and the effective height of the cleats 88. Thus, the steerable wheels 12 on the front of the tractor 10 remain effective to steer the tractor 10. However, when the tractor 10 is disposed on soft ground surfaces or on packed snow, the forward cleats 88 sink down into the supporting surface, at least to some extent, and thereby enable the rear lower cleats 88 to also frictionally engage the supporting surface. Nevertheless, inasmuch as a major portion of the weight of the rear of the tractor 10 transferred to the surface 94 is at a point disposed immediately beneath the lower peripheral portions of the drive wheels 14, the front steerable wheels 12 of the tractor 10 still remain effective to steer the tractor 10.

The axle 60 comprises an elongated cylindrical bar 100 whose longitudinal mid-portion has a pair of opposing channel members 102 and 104 welded thereto. In this manner, the longitudinal mid-portion of the bar 100 is adequately reinforced.

The endless belts 74 may be tensioned by threading the nuts 68 and 70 further onto the adjusting rods 64 after the fasteners 58 have been loosened. This will cause the axle 60 to be shifted rearwardly along the angle members 26.

The rear end of the mounting arm 24 includes a rearwardly projecting drawbar 108. The forward end of drawbar 108 is secured relative to the angle member 28 by welding 110 and the rear end of the drawbar 110 includes a vertical opening 112 formed therethrough whereby various trailing vehicles such as a wheeled trailer may be coupled to the drawbar 108.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a tractor of the type including steerable front wheels and a solid transverse rear axle housing journalling opposite side rear driving wheels from opposite ends thereof, a crawler track assembly for said tractor including an elongated mounting arm extending longitudinally of said tractor rearwardly of said housing and including a front end securely anchored and braced relative to said housing and against angular displacement relative thereto, said mounting arm including a rear end disposed and facing rearwardly of said housing, laterally spaced opposite side rear idle wheels disposed in front-to-rear alignment with and spaced rearwardly of said driving wheels, journal means journalling said idle wheels from said rear end about axes located at permanent elevations relative to said housing to position the lower peripheral portions of said idle wheels at elevations visually ascertainable as spaced above a horizontal plane containing the lower peripheral portions of said front and driving wheels, and opposite side endless track assemblies trained about corresponding drive and idle wheels and including guide structures spaced therealong guidingly engaged with the outer peripheral portions of said driving and idle wheels for maintaining said track assemblies trained thereabout.

2. The tractor of claim 1 wherein said journal means includes means operative to adustably shift said axes longitudinally of said mounting arm, whereby the tension of said track assemblies may be adjusted to maintain a friction drive connection between said driving and idle wheels through said track assemblies.

3. The tractor of claim 1 wherein said journal means includes a horizontal transverse axle mounted on the rear end of said mounting arm and upon whose opposite ends said idle wheels are journalled.

4. The tractor of claim 3 wherein said journal means includes means mounting said transverse axle on the rear end of said mounting arm for adjustable shifting longitudinally of said mounting arm.

5. The tractor of claim 1 wherein said endless track assemblies include endless belts trained about corresponding driving and idle wheels and including inner and outer surfaces, said belts including longitudinally spaced channel segments equipped with outwardly divergent arms secured thereto at points spaced longitudinally therealong and with said arms projecting outwardly from said inner surfaces, said channel segments embracingly engaging outer peripheral portions of said idle and driving wheels for guidingly retaining said endless belts trained about said idle and driving wheels.

6. The tractor of claim 5 wherein said endless belts include longitudinally spaced outwardly opening and transversely extending channel-shaped cleats supported therefrom and spaced longitudinally therealong, said channel-shaped cleats projecting outwardly of the outer surfaces of said endless belts.

7. The tractor of claim 6 wherein each of said channel segments includes a corresponding channel cleat, corresponding channel segments and channel-shaped cleats being secured to said endless belts through the utilization of fasteners secured through said belts and a corresponding channel-shaped cleat and channel segment.

8. The tractor of claim 7 wherein said journal means includes means operative to adjustably shift said axes longitudinally of said mounting arm, whereby the tension of said track assemblies may be adjusted to maintain a friction drive connection between said driving and idle wheels through said track assemblies.

9. The tractor of claim 8 wherein said journal means includes a horizontal transverse axle mounted on the rear end of said mounting arm and upon whose opposite ends said idle wheels are journalled.

10. The tractor of claim 1 wherein the lower peripheral portions of said idle wheels are spaced between 1 and 2 inches above said horizontal plane containing the lower peripheral portions of said front and driving wheels.

* * * * *